June 13, 1933.  A. ULRICH  1,914,054
SOLDERING TOOL FOR ALUMINIUM AND ALUMINIUM ALLOYS
Filed July 15, 1932  2 Sheets-Sheet 2

Patented June 13, 1933

1,914,054

UNITED STATES PATENT OFFICE

ARTHUR ULRICH, OF ZURICH, SWITZERLAND

SOLDERING TOOL FOR ALUMINIUM AND ALUMINIUM ALLOYS

Application filed July 15, 1932, Serial No. 622,774, and in Switzerland July 24, 1931.

This present invention relates to soldering-tools of the type which may be used for soldering aluminium and aluminium alloys.

An object of the invention is to provide a device of this character having at its bearing surface a metal wire brush consisting of a number of tightly packed wires or bunches of wire, by which means the soldering seam may during the operation thoroughly be rubbed or brushed while the molten metal is on said spot, which is absolutely necessary to obtain a solid joint for objects of aluminium or aluminium alloys.

Another object is to provide a heating means attached to said soldering-tool the flame of which may be directed at the same time on the tool and on the soldering joint or seam which is also necessary when soldering aluminium or aluminium alloys because those metals must constantly be heated on account of their good heat conductivity.

Other objects of the invention will become apparent as the description proceeds.

An embodiment of the invention is illustrated in the accompanying drawings wherein.

Figure 1:
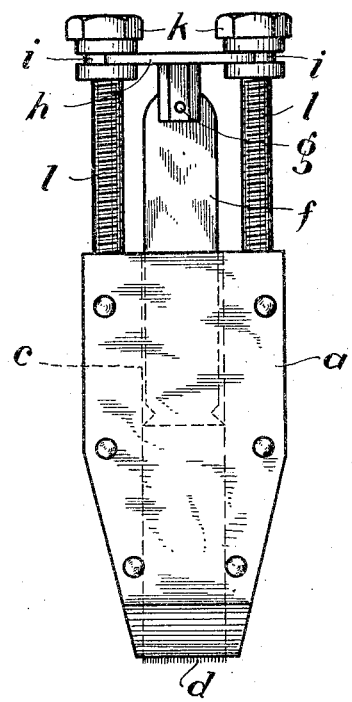
Fig. 1 is a side view of the soldering copper.
Figure 2:
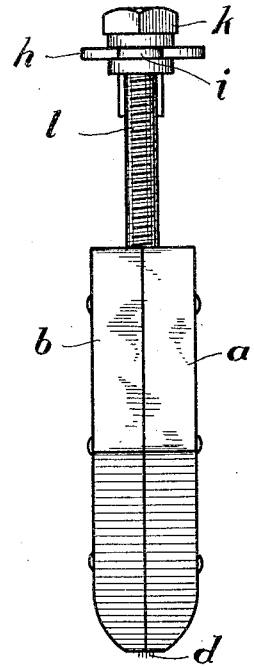
Fig. 2 is a front view thereof.
Figure 3:
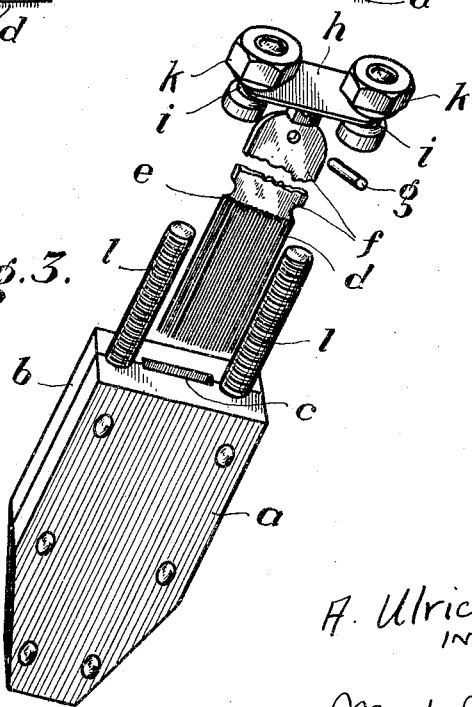
Fig. 3 is a perspective view of the device partly taken apart.

The soldering copper (Figs. 1–3) consists of two halves $a$ and $b$ riveted together. Those halves are thus cut out that, after they are riveted together, a longitudinal slot $c$ is formed. In this slot $c$ a bunch of wire $d$ is slidably arranged. This bunch $d$ consists of a great number of steel wire bristles welded at $e$ onto a slide $f$ which is attached with a pin $g$ at a bridge $h$. This bridge has at both ends two semi-circular incisions into which the grooves $i$ of the two adjusting nuts $k$ fit. Those nuts may be screwed up or down along two spindles $l$ the lower extremities of which are jammed between the two halves $a$ and $b$. All according to what degree the nuts $k$ are screwed down the metal bristle bunch $d$ will be more or less protruding from the lower end of the slot $c$.

The protruding bristles form on the bearing surface of the soldering copper a narrow continuous metal brush by means of which the to be soldered together aluminium parts may thoroughly be brushed during the operation which is necessary to destroy the film of oxide preventing in ordinary cases the soldering or brazing of aluminium and aluminium alloys.

As soon as the bristles are fretted and worn out the brush can easily be replaced. For doing this it is only necessary to remove the bridge $h$ by loosening the nuts $k$ and to pull out the pin $g$ whereupon the worn out insertion piece $f$, $d$ may be replaced by a new one.

As it is possible to regulate the length of the bristles by means of the slide $f$ the bunch of wire $d$ may for instance completely be drawn back after the tin-solder has thoroughly been rubbed in, in order to continue the soldering operation without being hindered by the protruding bristles.

Figure 4:
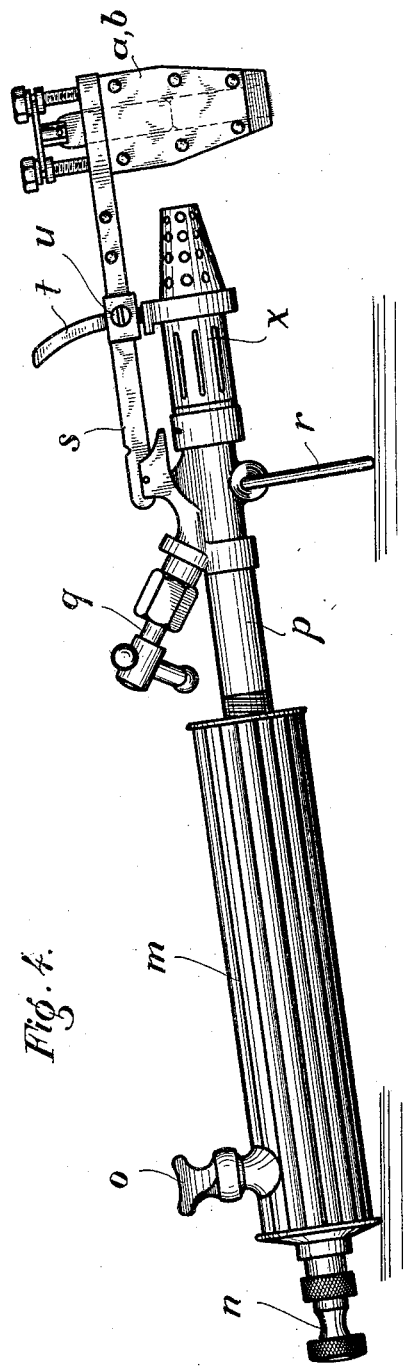
Fig. 4 shows an elevation of the device being provided with a petrol vapor burner.

In Fig. 4 is shown how the described soldering copper may be combined with a petrol vapor burner which will permit to heat the copper and the to be soldered metal parts continuously during the soldering operation. This burner has a petrol container $m$ with an air pump $n$ and a filling opening shut off by a screw cover $o$. A tube $p$ connects the container $m$ with the actual burner $x$ of a known construction. The petrol supply for this burner may be regulated by a screw valve $q$. The tube $p$ is provided with a support $r$ which may be turned up against the tube $p$, and with an arm $s$ carrying the above described soldering iron. This arm may be regulated by means of a curved guide $t$ and a clamp screw $u$.

When soldering with the device it is necessary to heat up the copper and then the flame of the burner $x$ is thus regulated that both the copper and the soldering joint are heated simultaneously. Then the molten tin-solder is applied and rubbed in, in order to destroy the film of the oxide of the aluminium or aluminium alloy and to secure a perfect soldering.

Having fully described my invention, what I claim is:

1. In a soldering-tool for aluminium and aluminium alloys, the combination of a soldering copper with a metal wire brush slidably adjustable in the copper, as and for the purpose set forth.

2. In a soldering-tool for aluminium and aluminium alloys, the combination with a soldering copper, a bunch of tightly packed metal wires or bristles movably mounted in a longitudinal slot of said soldering copper, and means to move and fix said wires or bristles in said slot so as to adjust the length of the bristles protruding from the lower end of said slot.

3. In a soldering-tool for aluminium and aluminium alloys, the combination with a soldering copper, a bunch of tightly packed metal bristles movably mounted in a longitudinal slot of said soldering copper, a slide attached to said bristles, a bridge to which said slide may be fixed, grooved nuts to guide said bridge, and spindles anchored in said soldering copper and along which said grooved nuts may be screwed up or down.

4. In a soldering-tool for aluminium and aluminium alloys, the combination with a soldering copper, an adjustable metal wire brush, a liquid fuel burner, a turning joint connection in said burner with said copper, and means adapted to fix said copper in any desired position allowed by said turning joint.

In testimony whereof I affix my signature.

ARTHUR ULRICH.